United States Patent [19]
Nakajima et al.

[11] Patent Number: 4,947,394
[45] Date of Patent: Aug. 7, 1990

[54] SPARE CHANNEL MONITOR CIRCUIT

[75] Inventors: Masahiro Nakajima; Satoshi Kashiwaba, both of Tokyo, Japan

[73] Assignee: NEC Corporation, Tokyo, Japan

[21] Appl. No.: 285,985

[22] Filed: Dec. 19, 1988

[30] Foreign Application Priority Data

Dec. 17, 1987 [JP] Japan .................... 62-317509

[51] Int. Cl.$^5$ .............................. G06F 11/30
[52] U.S. Cl. ..................... 371/20.1; 371/8.2; 371/5.1
[58] Field of Search .............. 371/5.1, 5.3, 5.4, 5.5, 371/8.1, 8.2, 11.2, 20.1, 20.2, 20.3; 370/13, 14; 375/10; 455/67; 358/139; 379/1, 26

[56] References Cited

U.S. PATENT DOCUMENTS

| | | | |
|---|---|---|---|
| 4,658,399 | 4/1987 | D'Angio | 371/5.1 |
| 4,760,514 | 7/1988 | Hasegawa | 371/5.1 |
| 4,807,226 | 2/1989 | Naka | 371/8.2 |
| 4,821,267 | 4/1987 | Draegh | 371/20.1 |

*Primary Examiner*—Michael R. Fleming
*Attorney, Agent, or Firm*—Sughrue, Mion, Zinn, Macpeak & Seas

[57] ABSTRACT

In a monitor circuit, bipolar-to-unipolar (B/U) converters are respectively connected to spare channels to convert bipolar test signals of pseudo-random sequence received therethrough to RZ (return-to-zero) signals and thereafter to NRZ signals. Each B/U converter includes a clock recovery circuit recover clock pulses from the RZ signal. The original pseudo-random sequence is recovered from successive instants of the NRZ signal of each B/U converter in response to successive clock pulses. Divide-by-M counters are respectively connected to the clock recovery circuits to generate low frequency clock pulses, which drive D flip-flops to convert the bit pattern of each pseudo-random sequence so that the edges of the binary digits in the converted sequence has a sufficient timing margin with respect to a sampling point at which mismatch is detected between the sequences derived from the space channels. Detected mismatches are counted to indicate the signal quality and usage of the spare channels when the count exceeds a predetermined level during a specified time interval.

5 Claims, 2 Drawing Sheets

SPARE CHANNEL MONITOR CIRCUIT

BACKGROUND OF THE INVENTION

The present invention relates to a monitor circuit for monitoring signal quality of spare channels of digital radio.

In a prior art spare channel monitor circuit which is shown and described in European Patent Application No. 0,243,938 (published Nov. 4, 1987), a single clock recovery circuit is provided for a plurality of digital radio spare channels to recover clock pulses from one of the spare channels. The clock pulses occur at the frequency of AMI (alternate mark inversion) test signals transmitted through the spare channels. The AMI test signals are decoded to recover the original pseudo-random sequence from each spare channel. Signal quality of the spare channels is determined by the occurrences of a mismatch between the decoded signals of the spare channels and this mismatch detection is timed with the clock pulse. However, since pulse stuffing techniques are usually employed in the digital radio transmission channels, "destuffing" jitter occurs in the channels and the timing margin of the mismatch detection must be restricted to avoid the destuffing jitter.

SUMMARY OF THE INVENTION

It is therefore an object of the present invention to provide a channel monitor circuit for a digital transmission system which allows a sufficient timing margin for detecting a mismatch between signals transmitted through spare channels.

In the digital transmission system, spare channels are provided as a backup for regular channels. In the event of a fault in one of the regular channels, protection switching is performed by disconnecting the failed channel from the system and bringing a spare channel into action to ensure continuity of service. The spare channels are constantly monitored by the channel monitor circuit in terms of their signal qualities and their usage in the transmission system. During idle state bipolar test signals of identical bit pattern are transmitted through the spare channels to determine their signal qualities. When one of the spare channels is brought into the system, a data bit stream of the system is transmitted through that channel. This data bit stream is also detected by the monitor circuit where it is compared with the bit patterns of the test signals received by way of the other spare channels to determine the usage of the spare channel.

In accordance with the present invention, the channel monitor circuit comprises N bipolar-to-unipolar (B/U) converters associated respectively with N spare channels. Each of the B/U converters converts a bipolar test signal transmitted by way of the associated spare channel to a corresponding RZ (return-to-zero) signal, converts it further to a corresponding NRZ (non-return-to-zero) signal. A plurality of phase detectors are provided respectively for the B/U converters, each recovering a sequence of binary digits from successive instants of the NRZ signal. N clock recovery circuits are provided respectively for the N bipolar-to-unipolar converters to recover clock pulses at unit intervals from the RZ signals. N counters are respectively connected to the clock recovery circuits for generating low frequency clock pulses at intervals M times greater than the unit intervals, where M is an integer greater than unity. Respectively associated with the phase detectors are bistable devices each of which transfers a logic value of binary digits from the associated phase detector to an output terminal in response to an edge of the low frequency clock pulse generated by the associated counter and holds the transferred logic value at said output terminal until an opposite logic value of said binary digits appears simultaneously with the occurrence of a subsequent clock instant of the last-mentioned low frequency clock pulse. A mismatch is detected between signals from the output terminals of the N bistable devices as an indication of qualities of said spare channels in response to the low frequency clock pulses generated by one of the counters.

Preferably, N−1 second phase detectors are associated respectively with N−1 of the N counters. Each of the N−1 phase detectors detects a phase difference between signal from one of the N counters which is not associated with the N−1 second phase detectors and signal from the associated counter and resetting it so that the phase difference reduces to zero.

BRIEF DESCRIPTION OF THE DRAWINGS

The present invention will be described in further detail with reference to the accompanying drawings, in which.

DETAILED DESCRITPION

Figure 1:
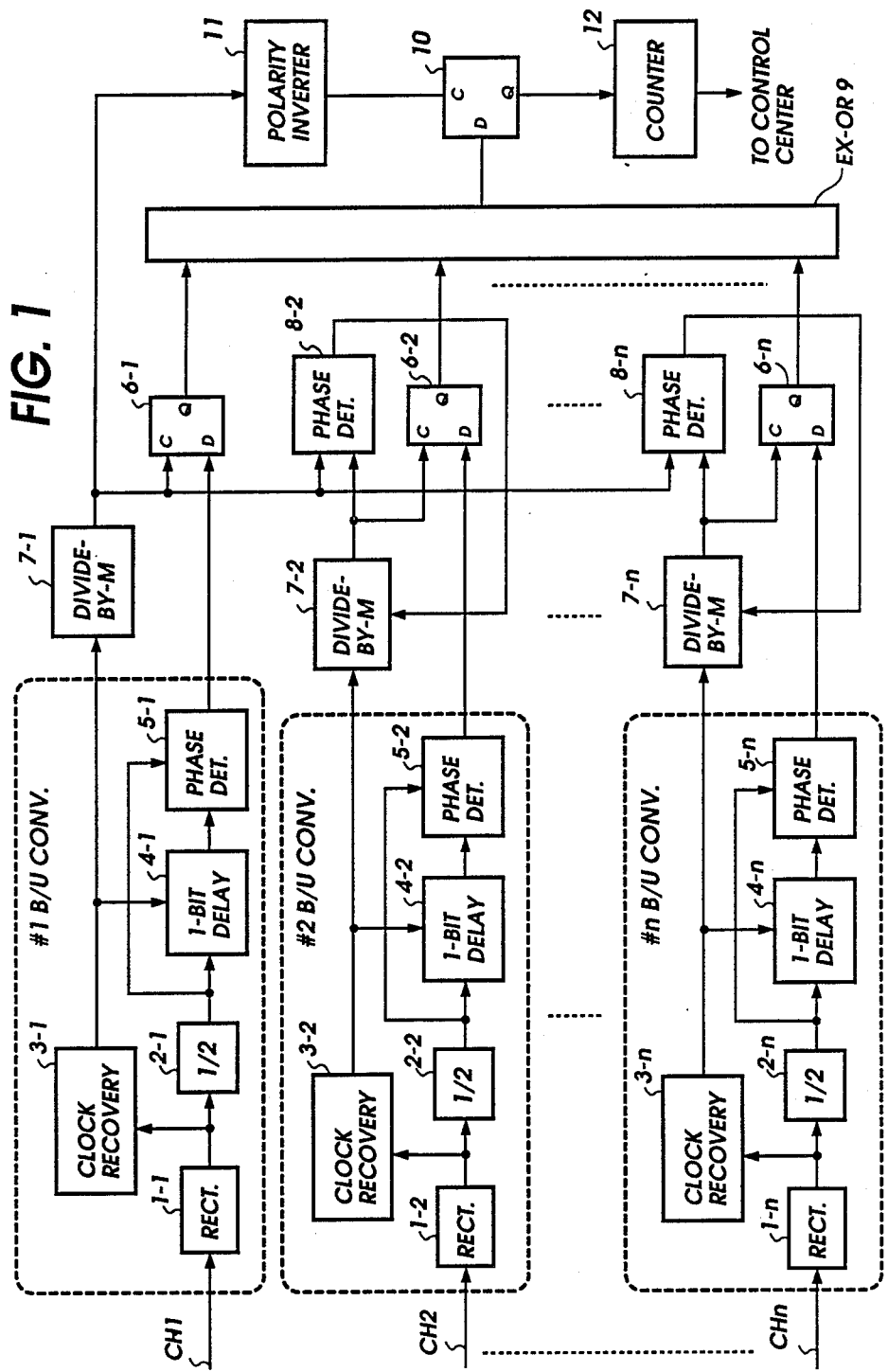
FIG. 1 is a block diagram of a channel monitor circuit according to the present invention.
Figure 2:
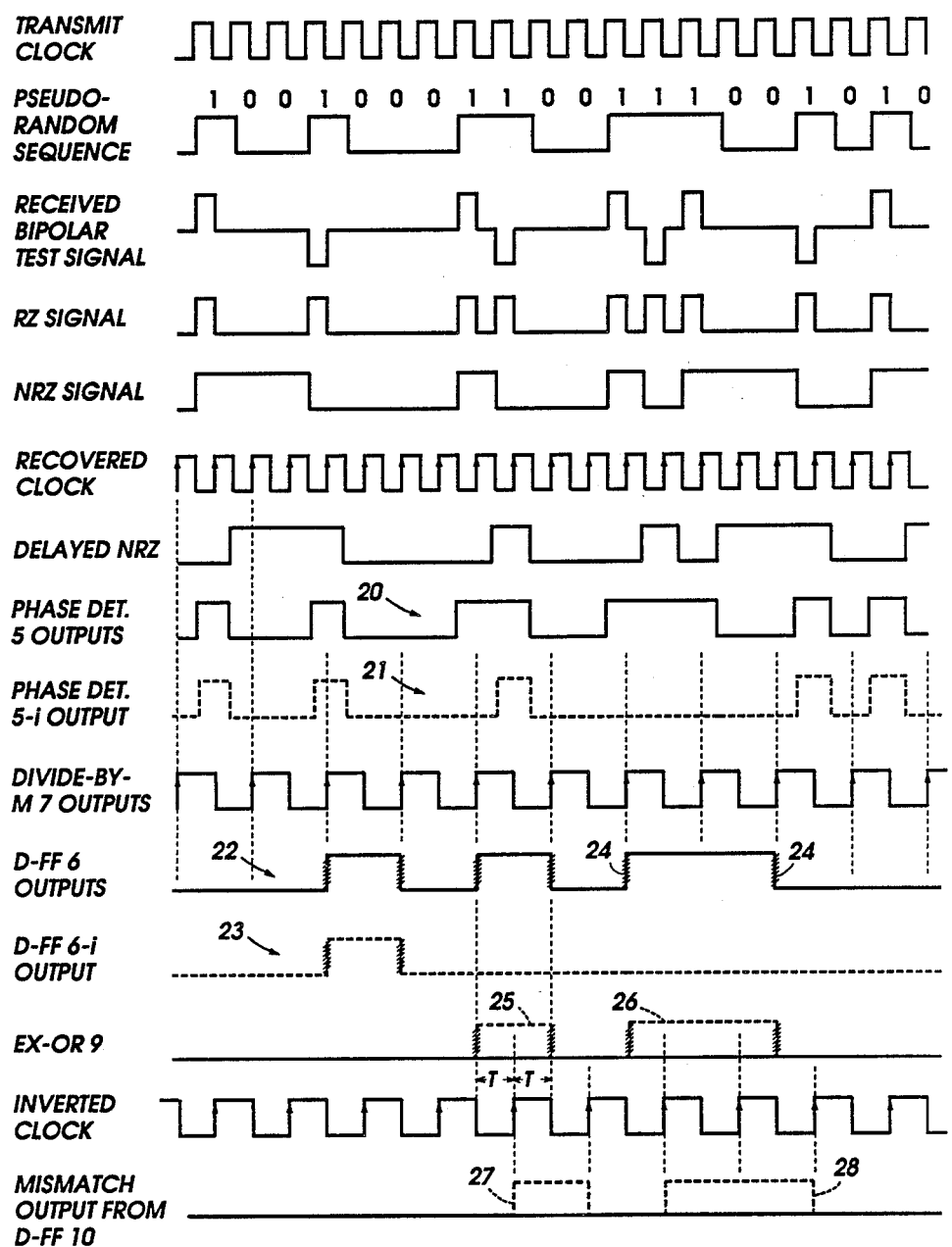
FIG. 2 is a timing diagram associated with the monitor circuit of the invention.

Referring now to FIG. 1, there is shown a spare channel monitor circuit for a digital transmission system according to a preferred embodiment of this invention. The monitor circuit of the invention comprises #1 to #n B/U converters of identical construction which are resectively associated with #1 to #n spare channels CH1 to CHn. At the distant end of each spare channel is connected a pseudo-random generator, not shown, which generates a pseudo-random sequence as shown in FIG. 2 in response to a transmit clock pulse and translates it into a bipolar, or AMI (alternate mark inversion) format. Duringg idle state, the AMI signal of identical bit pattern is transmitted as a test signal over each of the spare channels #1 through #n to the associated B/U converters. The spare channels are automatically switched into the system to carry data bit streams in the event of a fault in one of the regular channels of the system. In such events, the data bit streams are also detected by the monitor circuit together with the test signals.

Each B/U converter comprises a rectifier 1 connected to the receive end of the associated spare channel to convert the received bipolar signal to a return-to-zero (RZ) signal for coupling to a divide-by-2 counter 2 and to a clock recovery circuit 3. The output of each divide-by-2 counter 2 is a non-return-to-zero (NRZ) signal as shown in FIG. 2 and the output of each clock recovery circuit 3 is a replica of the transmit clock pulse. The NRZ signal of each B/U converter is applied to a one-sample delay 4 and to a first input of a phase detector 5 to the second input of which the output of the delay 4 is applied. The NRZ signal of recovered at a given clock instant and the one-sample delayed NRZ signal are compared by each phase detector 5 to recover a replica of the original pseudo-random sequence.

Each of the recovered pseudo-random sequences from the B/U converters is applied to the data input of an associated one of D flip-flops 6-1 through 6-n. The output of each clock recovery circuit 3 is applied to an associated one of divide-by-M counters 7-1 through 7-n to produce an output pulse at every M-th count of clock pulses from the clock recovery circuit 3. In a practical embodiment, M is an integer greater than unity.

The divide-by-M counter 7-1, which is associated with the #1 B/U converter, supplies its output pulse to the clock input of the associated D flip-flop 6-1. This output pulse is also applied as a low frequency reference clock pulse to the first inputs of phase detectors 8-2 through 8-n which are associated respectively with the #2 to #n B/U converters.

On the other hand, the divide-by-M counters 7-2 through 7-n, which are associated respectively with #2 through #n B/U converters, are of a resettable type and supply low frequency clock pulses to the clock input of their associated D flip-flops 6-2 through 6-n as well as to the second input of their associated phase detectors 8-2 through 8-n. The outputs of phase detectors 8-2 to 8-n are respectively coupled to the reset inputs of the divide-by-M counters 7-2 to 7-n to reset their clock timing so that a phase differences between the reference clock pulse from the divide-by-M counter 7-1 and those of the other divide-by-M counters are reduced to zero.

The outputs of the D flip-flops 6-1 through 6-n are connected to a mismatch detector which comprises an exclusive-OR 9 to which the outputs of D flip-flops 6-1 to 6-n are connected. The output of exclusive-OR gate 9 is connected to the data input of D flip-flop 10. The input to the clock terminal of D flip-flop 10 is derived from a polarity inverter 11 which inverts the polarities of the reference clock from divide-by-M counter 7-1 so that the significant instants, or leading edges of the output of inverter 11 are shifted by one clock interval of the recovered clock timing. The output of D flip-flop 10 is applied to a counter 12 which generates an output when the count of mismatches exceeds a predetermined value during a specified time interval.

For a full understanding of the present invention, the operation of the spare channel monitor circuit of FIG. 1 will be described hereinbelow with reference to a timing diagram shown in FIG. 2.

The output of each phase detector 5 is exactly a replica of the original pseudo-random sequence unless the bipolar test signal transmitted over the associated spare channel has been disrupted by noise. Assume that M is 2, each divide-by-M counter 7 produces a low frequency clock pulse at one half the rate of the clock pulses recovered by the clock recovery circuits 3 as shown in FIG. 2. Each of the phase detectors 8-2 to 8-n detects a phase difference between the low frequency reference clock from divide-by-M counter 7-1 and the output of their associated one of the divide-by-M counters 7-2 to 7-n of the resettable type. If a phase difference exists, the clock timing of the associated resettable counter 7 is reset until the phase difference reduces to zero. In this way, the output pulses of all the divide-by-M counters 7-1 to 7-n are rendered time coincident with each other.

Each of the D flip-flops 6-1 through 6-n transfers a logic state of the binary signal from the associated one of the phase detectors 5-1 through 5-n to its Q output terminal in response to the leading edge of a clock pulse which is supplied from the associated divide-by-M counter 7.

If all the spare channels remain idle, identical pseudo-random patterns as indicated by a solid-line waveform 20 will be detected by the phase detectors 5-1 through 5-n and no mismatch output will be detected. More specifically, each of the identical pseudo-random waveforms 20 from phase detectors 5-1 through 5-n is converted to a waveform 22 by the associated D flip-flop 6 in response to the leading edges of the low frequency clock pulse supplied from the associated divide-by-M counter 7. The individual pulses of the waveforms 22 from the D flip-flops 6-1 through 6-n are compared against each other by the exclusive-OR gate 9. It is seen that the individual pulses of the output of each D flip-flop 6 has a minimum duration which is twice (M=2) as large as the recovered clock interval. Exclusive-OR gate 9 may produce short-duration pulses if mismatch occurs between the leading and trailing edges due to destuffing jitter as indicated at 24. However, D flip-flop 10 is clocked in response to the leading edges of clock pulses from the polarity inverter 11 that occur at instants sufficiently spaced from the indefinite edges of the pulses being compared by exclusive-OR gate 9 to avoid misinterpretation. Therefore, a sufficient timing margin T is secured between the instant of mismatch detection and the leading and trailing edges of the pulses even if they are blurred by destuffing jitter.

If protection switching occurs in one of the spare channels due to a fault in a regular channel, a stream of data bits will be received by the monitor circuit through the switched spare channel, instead of the test signal which has been previously received. Because of the significant differences between the patterns of the data signal and the test signals transmitted over the other spare channels, mismatches occur between them. In such instances, the data bit pattern generated by phase detector 5-i, associated with such a spare channel, may be indicated by a dotted-line waveform 21 which significantly differs from the waveform 20 of the pseudo-random pattern. D flip-flop 6-i, associated with that spare channel, will produce an output as indicated by a dotted-line waveform 23. This waveform is compared by exclusive-OR gate 9 on a bit-by-bit basis with the waveforms 22 from the other D flip-flops 6. Thus, exclusive-OR gate 9 produces logic-1 outputs indicated at 25 and 26 whose edges may also be affected by destuffing jitter. Since these edges are spaced a sufficient timing margin T from the sampling instant, or leading edge of the inverted clock, the D flip-flop 10 generates clearly defined output pulses shown at 27 and 28. These pulses are counted by the counter 12 to produce an output when the count exceeds a predetermined value during a specified time interval. The output of the counter 12 is applied to a maintenance center, not shown, to indicate the signal qualities and the usages of the spare channels.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A circuit for monitoring N spare channels of a digital transmission system which transmits bipolar test signals through said spare channels during idle state and data bit streams through one or more of said spare channels in the event of a fault in a regular channel of said system, where N is an integer greater than unity, comprising:

N bipolar-to-unipolar converter means connected respectively to said spare channels, each of said bipolar-to-unipolar converter means including means (1, 2, 4) for converting the bipolar test signal of the connected spare channel to a corresponding RZ (return-to-zero) signal and converting the RZ signal to a corresponding NRZ (non-return-to-zero) signal, and a phase detector means (5) for recovering a sequence of binary digits from successive instants of said NRZ signal;

N clock recovery circuits (3-1, . . . 3-n) associated respectively with said N bipolar-to-unipolar converter means for recovering clock pulses at unit intervals from the RZ signals of the associated bipolar-to-unipolar converter means;

N counter means (7-1, . . . 7-n) respectively connected to said clock recovery circuits (3-1, . . . 3-n) for generating low frequency clock pulses at intervals M times greater than said unit intervals, where M is an integer greater than unity;

N bistable means (6-1, . . . 6-n) respectively associated with said phase detector means (5-1, . . . 6-n), each of said bistable means transferring a logic value of binary digits from the associated phase detector means to an output terminal in response to an edge of the low frequency clock pulse generated by the associated counter means and holding the transferred logic value at said output terminal until an opposite logic value of said binary digits appears simultaneously with the occurrence of a subsequent clock instant of the last-mentioned low frequency clock pulse; and means (9, 10, 11) for detecting a mismatch between signals from the output terminals of said N bistable means in response to said low frequency clock pulses generated by one of said counter means.

2. A circuit as claimed in claim 1, further comprising N−1 second phase detector means (8-2, . . . 8-n) associated respectively with N−1 of said N counter means, each of said N-1 second phase detector means detecting a phase difference between signal from one of said N counter means and signal from the associated counter means and resetting same so that said phase difference reduces to zero.

3. A circuit as claimed in claim 1, wherein said mismatch detecting means comprises means for inverting the polarities of said low frequency clock pulse generated by one of said counter means which is not associated with said second pulse detector means, an exclusive-OR gate connected to the output terminals of said N bistable means for generating a signal at one of binary logic levels, a second bistable means for transferring a logic value of said signal from said exclusive-OR gate to an output terminal in response to an edge of the low frequency clock pulse generated by said counter means and holding the transferred logic value at said output terminal until an opposite logic value of said signal appears simultaneously with the occurrence of a subsequent clock instant of the last-mentioned low frequency clock pulse.

4. A circuit as claimed in claim 1, wherein said spare channels are digital radio channels.

5. A circuit as claimed in claim 1, further comprising a counter means for counting the detected mismatches and generating an output signal when the counted mismatches exceeds a predetermined value with a predetermined time interval.

* * * * *

UNITED STATES PATENT AND TRADEMARK OFFICE
CERTIFICATE OF CORRECTION

PATENT NO. : 4,947,394

DATED : August 7, 1990

INVENTOR(S) : Nakajima et al

It is certified that error appears in the above-identified patent and that said Letters Patent is hereby corrected as shown below:

In the Abstract, line 17, delete "space" and insert --spare--.

Col. 2, line 44, delete "Duringg" and insert --During--.

Col. 5, line 25, delete "6-n" and insert --5-n--.

Signed and Sealed this

Thirty-first Day of March, 1992

Attest:

HARRY F. MANBECK. JR.

*Attesting Officer*   *Commissioner of Patents and Trademarks*